United States Patent
Simon (10) Patent No.: US 6,289,930 B1
(45) Date of Patent: Sep. 18, 2001

(54) REFRIGERANT EXPANSION DEVICE HAVING COMBINED PISTON ORIFICE VALVE AND SOLENOID-ACTUATED CLOSURE

(76) Inventor: Ward J. Simon, 1008 Princeton Rd., Madison, AL (US) 35758

(*) Notice: Subject to any disclaimer, the term of this patent is extended or adjusted under 35 U.S.C. 154(b) by 0 days.

(21) Appl. No.: 09/624,312

(22) Filed: Jul. 24, 2000

Related U.S. Application Data (60) Provisional application No. 60/145,295, filed on Jul. 23, 1999.

(51) Int. Cl.[7] .................................................. F16K 15/18
(52) U.S. Cl. .............................. 137/601.14; 137/601.18; 137/601.21
(58) Field of Search ........................ 137/599.16, 599.18, 137/601.14, 601.18, 601.21

(56) References Cited

U.S. PATENT DOCUMENTS

| | | | |
|---|---|---|---|
| 2,863,473 | * | 12/1958 | Gantz ........................... 137/601.14 X |
| 3,477,466 | * | 11/1969 | Sturm ........................... 137/601.14 X |
| 4,147,180 | * | 4/1979 | Steele ............................... 137/599.18 |
| 4,624,282 | * | 11/1986 | Fargo ............................... 137/599.16 |
| 5,588,590 | * | 12/1996 | Sakakibara et al. ............... 236/92 B |
| 5,894,741 | * | 4/1999 | Durham et al. ........................ 62/525 |

\* cited by examiner

Primary Examiner—Stephen M. Hepperle
(74) Attorney, Agent, or Firm—Joseph H. Beumer

(57) ABSTRACT

A refrigerant expansion valve for an air conditioning system is combined with a solenoid-actuated closure device in a common housing. The housing provides for placement of the solenoid valve in a position to shut off fluid flow across the expansion device, with a plunger being placed to come into sealing contact with a piston bore of the expander or with a sealing surface defined in the housing proximate to the piston. Shutting off flow across the expander prevents loss of pressure differential during "off" portions of an operating cycle, thus providing a saving of energy costs.

8 Claims, 6 Drawing Sheets

REFRIGERANT EXPANSION DEVICE HAVING COMBINED PISTON ORIFICE VALVE AND SOLENOID-ACTUATED CLOSURE

This application claims the benefit of Provisional Application Ser. No. 60/145,295, filed Jul. 23, 1999.

FIELD OF THE INVENTION

This invention relates to refrigeration and cooling systems which include a piston orifice expansion device.

BACKGROUND OF THE INVENTION

Air conditioning and refrigeration systems typically operate in a cycle which employs a series of functions, including a compression step wherein low-pressure refrigerant gas is compressed to a high-pressure state and a condensation step in which the gas is converted to a liquid, accompanied by a release of heat.. The condensed liquid is then forced under pressure through an expansion device, partially converting the liquid to a gaseous state, after which the refrigerant is passed through a second heat exchanger or evaporator stage where heat from the surrounding air is transferred to the refrigerant, resulting in cooling of the air. Low pressure gas produced by evaporation is then recycled to the compressor.

Air conditioning systems generally use one of three different types of expansion devices; a thermostatic expansion valve, a capillary tube or tubes with a precise diameter or length or a fixed orifice piston check valve having a cylindrical chamber in which a piston with an axial bore is mounted for movement responsive to the direction of fluid flow. This invention is concerned with the third type, that is, expanders using a piston orifice check valve. Orifice pistons in these devices move from a position at the rearward end of the chamber to a position at the opposite or forward end, where the periphery of the piston is sealed by fluid-tight engagement of mating surface of the piston and chamber so that forward flow of the refrigerant is restricted to the central orifice of the piston. The orifice is sized according to system specifications to provide a selected pressure drop within the refrigerant flow stream. Flow in the reverse direction toward the rearward end of the chamber would cause the piston to move out of sealing engagement with the chamber, allowing unrestricted movement of the fluid through flutes or grooves around the periphery of the piston. Reverse flow would thus be provided as would be required for systems using a heat pump cycle. Piston orifice expansion devices of this type are exemplified by U.S. Pat. No. 5,894,741, issued Apr. 20, 1999, to Durham, et al.

A problem associated with piston orifice check-valve expansion devices is that the pressure which builds up across the piston when the system is operating is allowed to bleed down through the orifice when the system cuts off, which occurs periodically. This results in a requirement for use of additional energy to bring the system back to operating pressure upon start up. Providing a means for maintaining operating pressure differential across the piston during the off cycle would result in higher system efficiency and a consequent saving of energy costs.

Solenoid valves have been incorporated into the same valve body for certain types of expansion devices, as is disclosed in U.S. Pat. No. 5,588,590, issued Dec. 31, 1996, to Sakakibara, et al. The expansion valve of this device is a capillary type device, and the patent is concerned with eliminating impact noise resulting from "water hammer" by placing a solenoid valve between primary and secondary ports. The solenoid valve is not used to maintain a pressure different across the expander upon shutdown, the combined valve instead having an equalizer hole to reduce pressure differential. This patent makes reference to a prior Japanese patent publication disclosing use of a solenoid valve provided to the evaporator to shut off refrigerant flow to evaporators of a multi-stage system which are not in use, thus resulting in a saving of energy. The cited patent, however, does not disclose a combined device having a piston orifice valve and a solenoid valve disposed in a single integrated housing and functioning as a unit. Further improvements directed to prevention of migration of refrigerant between areas of different pressures would be desirable.

SUMMARY OF THE INVENTION

The present invention is directed to a refrigerant expansion device for an air conditioning or cooling system combined with a solenoid-actuated shut-off valve and incorporated in a common housing. The expansion device may comprise a conventional piston orifice check valve in which a piston having an axial throughbore orifice is disposed in a first, cylindrical chamber portion of a housing for sliding movement between the rearward and forward ends of the chamber. Forward ends of the chamber and piston have cooperating surfaces around their peripheries, which form a fluid-tight seal when the piston is exposed to high-pressure fluid from the rearward end of the chamber. This causes all of the refrigerant flow to be forced forward through the piston orifice, where it is subjected to controlled expansion.

A solenoid-actuated plunger of a shut-off valve is situated in a second portion of the housing in a position such as to make sealing contact with the rearward end of the piston orifice or with a sealable surface of the housing proximate the piston. The plunger serves to close off flow through the device during shut-off and to stop loss of pressure differential across the piston.

An arm of the housing is provided for support of the solenoid plunger in a desired alignment, which may be in an axial or radial direction with respect to the piston chamber. In addition, the plunger housing arm may provide support for a magnetic coil and biasing spring as required for actuation of the plunger. Suitable electronic controls are coupled to the solenoid to enable opening and closing movements of the plunger at necessary intervals in the operating cycle of the system.

The combined piston orifice expansion valve and solenoid valve closure of the invention is also suitable for use in "heat pump" systems wherein the direction of fluid flow through a pair of heat exchangers is reversible.

The combined expansion device and shut-off valve provides for positive control over movement of refrigerant fluid and the consequent loss of pressure differential which would otherwise occur during normal "off" portions of a cooling system cycle. As a result energy consumption is reduced and system efficiency is increased.

It is therefore, the object of this invention to provide a means for preventing loss of pressure differential due to bleeding down of pressure through a piston orifice during "off" portions of an air conditioning system operating cycle.

Another object is to provide a positive closure mechanism for shutting off refrigerant flow across such a piston.

Yet another object is to provide a common housing for containment of both an orifice-piston check valve and a solenoid-actuated shutoff valve in operating position.

Other objects and advantages of the invention will be apparent from the following detailed description and the claims appended hereto.

DESCRIPTION OF THE PREFERRED EMBODIMENT

Figure 1:
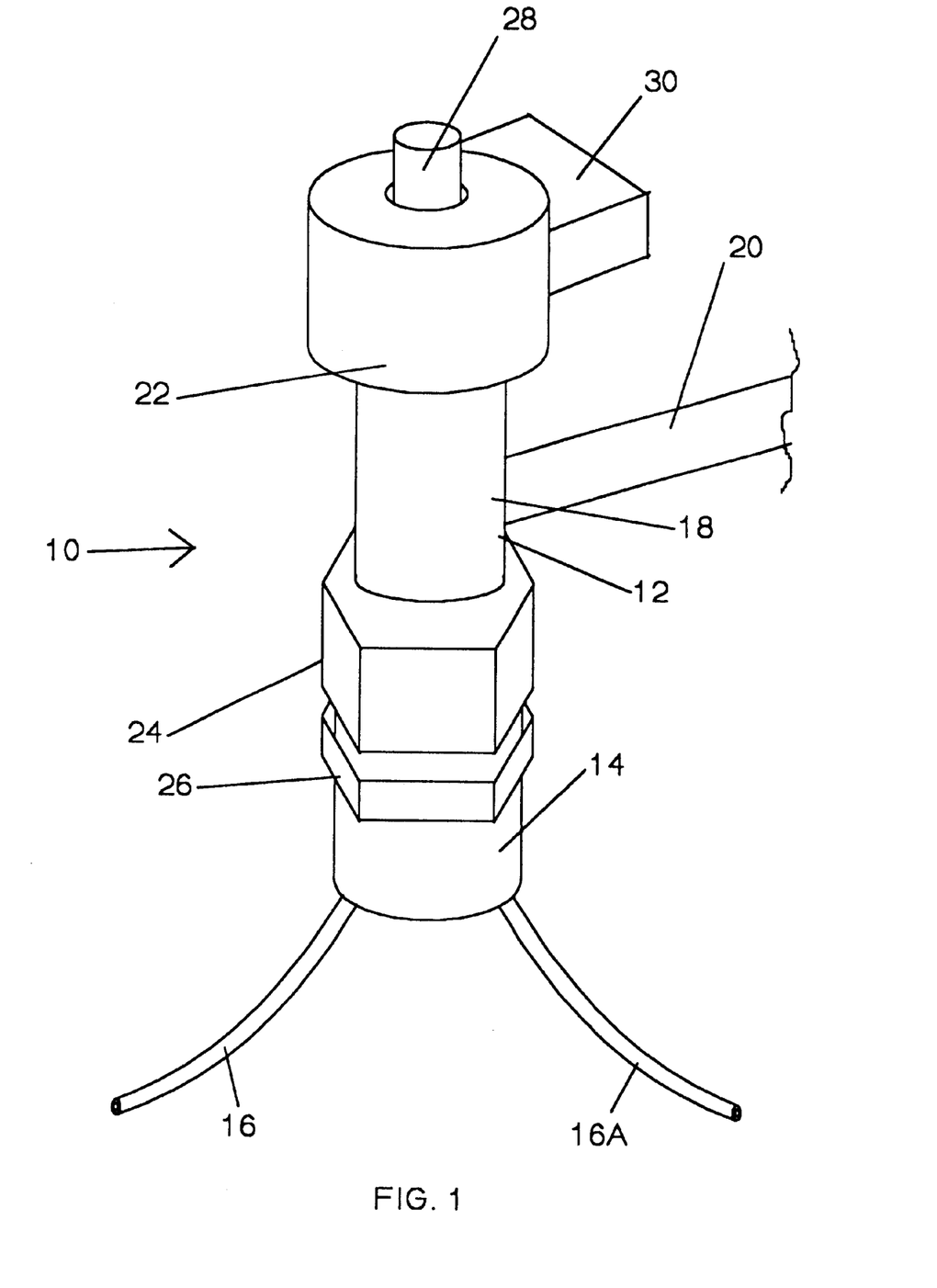
FIG. 1 is an external pictorial view of a combined piston orifice valve and solenoid actuated check valve in a common housing.

Referring to FIG. 1 of the drawings, there is shown an overall external view of a combined device 10 embodying the invention. The device has a housing 12 which includes three portions, a bottom, forward portion 14 communicating with exit tubes 16, 16A, an intermediate portion 18 secured to portion 14 and communicating with fluid entry port 20 and a rearward portion 22 connected to intermediate portion 18 and aligned to enable a plunger in the housing to be brought into contact with a sealing surface so as to close off fluid flow across a piston when the system cuts off. The housing also includes an outward protruding axial extension 28 to receive the outer end of the solenoid plunger and a rectangular receptacle 30 containing electrical control components. Swivel nut 24 is connected to housing portion 14, which secures the forward and intermediate portions in a manner such as to allow positioning in any direction with full 360 degree rotation. A hexagonal flat section 26 is provided on housing portion 14 to enable this portion to be held in place with a wrench while the swivel nut is being tightened.

It is to be understood that, for purposes of this application, the term "forward" is used to refer to the direction of fluid flow or location where the fluid exits the device when the expansion device is operating in a cooling mode. In this mode the fluid is forced to move solely through an axial orifice in the piston, while passageways around the periphery are sealed off. In the opposite or reverse flow mode, as would be used in heat pump applications, fluid flow would take place around the periphery of the piston without restraint.

Figure 2:
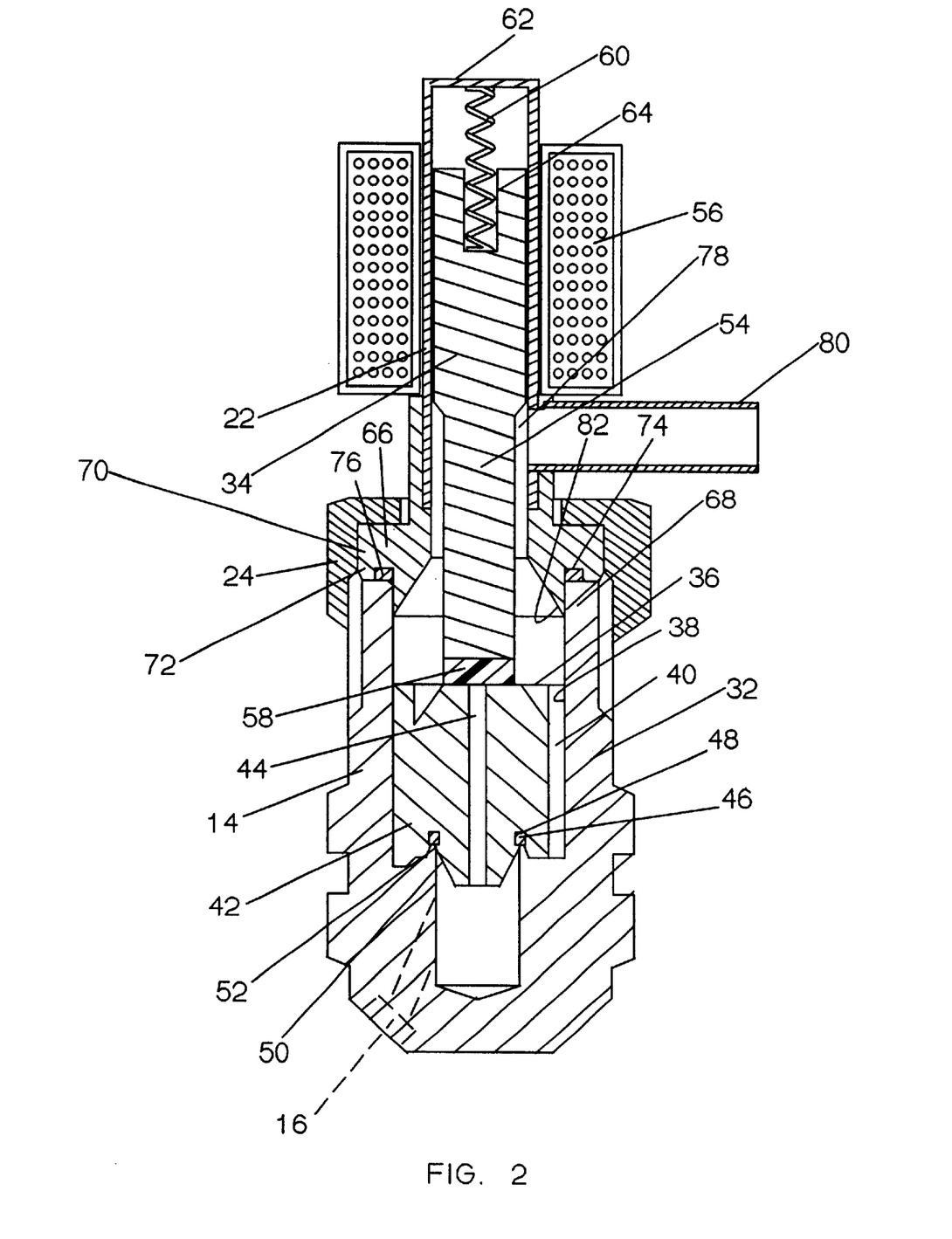
FIG. 2 is a sectional view of the combined valves of such a device, taken along a vertical axis.

FIG. 2 shows details of a specific orifice piston expansion valve 32 and a solenoid-actuated cutoff valve 34 combined into a unitary device embodying the invention. The expansion valve 32 has a piston 36 disposed in a generally cylindrical chamber 38 defined in housing portion 14 of the overall housing. The piston shown is a previously known commercial product referred to as a "5-fluted" gasketed piston distinguished by having five flutes or grooves 40 located between bosses 42 and extending around the periphery of the piston over its entire length. An orifice 44 extends through the piston along the axis thereof, and the piston has a sealing gasket 46 provided in a groove or gland 48 encircling a frustro-conial forward surface 50 spaced apart from the periphery of the piston and located to come into sealing contact with a sealing projection 52 of the chamber wall. When the piston is forced forward by refrigerant fluid flow, the gasket and sealing projection come into contact, forming a leak-proof seal so that fluid flow occurs only through orifice 44.

Solenoid valve 34, located in housing portion 22, is aligned axially with piston 36 so as to enable a plunger to be moved into position to shut off fluid flow through orifice 44. The solenoid valve has a magnetic coil 56 surrounding housing portion 22 to provide for engagement and disengagement of the plunger at appropriate times in an operating cycle. An elastomeric seal or gasket 58 may be placed at the plunger end to facilitate obtaining a leak-proof closure. A spring 60 at the top end 62 of the solenoid housing is placed in a receiving aperture 64 so as to bias the plunger forward a closed position.

An adapter flange 66 encircles the upper end 68 of housing portion 14 and is positioned to be forced downward into sealing relation with the housing upon tightening of swivel nut 24. The flange has a radially extending shoulder 70 with a downward projecting end portion 72, defining an annular cavity 74 in which a gasket 76 is placed. The adapter flange 66 extends upward above the shoulder and is secured to a lower portion of solenoid housing 22 by means such as brazing.

Entry port 78, defined by an aperature in the wall of the solenoid housing of an intermediate position, communicates with a pipe 80 joined to the housing wall.

When fluid flow occurs in the reverse direction, as would be the case for heat-pump systems, the piston moves backward to a rearward position limited by stop member 82 located at the forward end of adapter flank 66 which is connected to the housing by swivel nut 24. Flow in the reverse direction proceeds unrestrained through flutes 40 and outward through port 78.

Other types and variations of such pistons, including "3-fluted" and "double-headed" pistons may also be used. Further details regarding the referenced pistons are given in U.S. Pat. No. 5,894,741, which patent is hereby expressly incorporated by reference.

Figure 3:
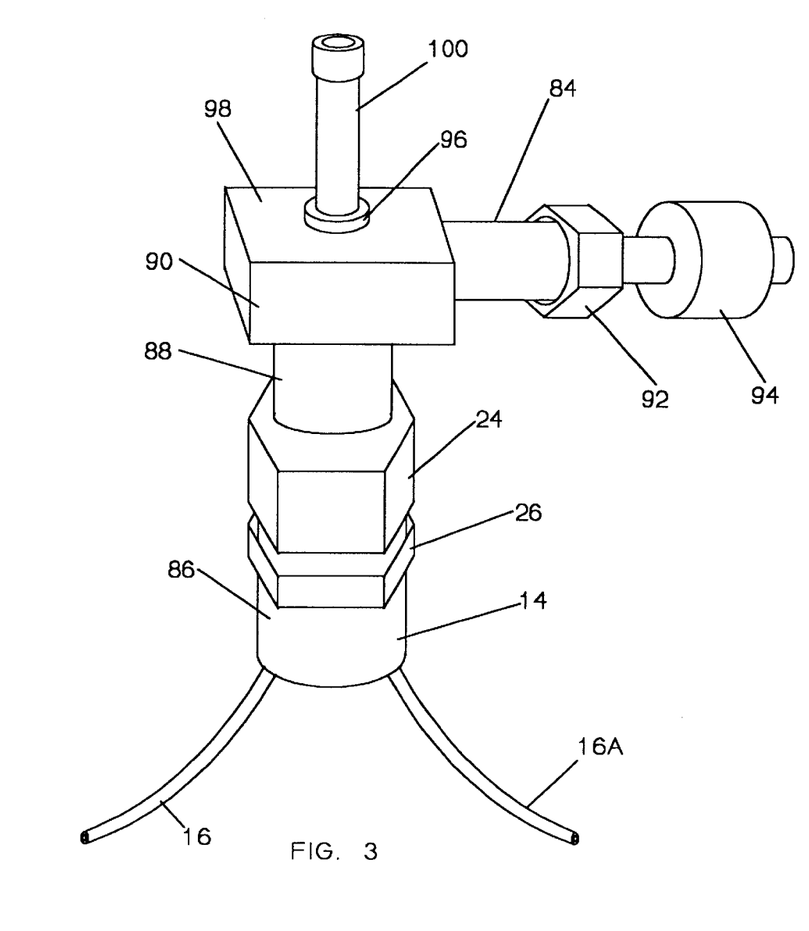
FIG. 3 is an external view of a device as in FIG. 2 except that the solenoid valve is disposed radially with respect to the piston orifice valve.

FIG. 3 shows a combined orifice piston valve and solenoid valve in which a solenoid valve 84 is aligned radially with respect a piston orifice valve 86. Components of the piston orifice valve in this embodiment may be essentially the same as described above for FIGS. 1 and 2, including exit ports 16, 16A, lower housing portion 14, swivel nut 24 and hexagonal projection 26. The intermediate housing portion 88 has a junction block 90 with internal passageways defining fluid paths and enabling necessary movements of a solenoid plunger. A swivel nut 92 is provided for attaching solenoid housing 94 in position to shut off fluid passage. Entry port 96 is defined in the top side 98 of the block, the port communicating with entry pipe 100.

Figure 4:
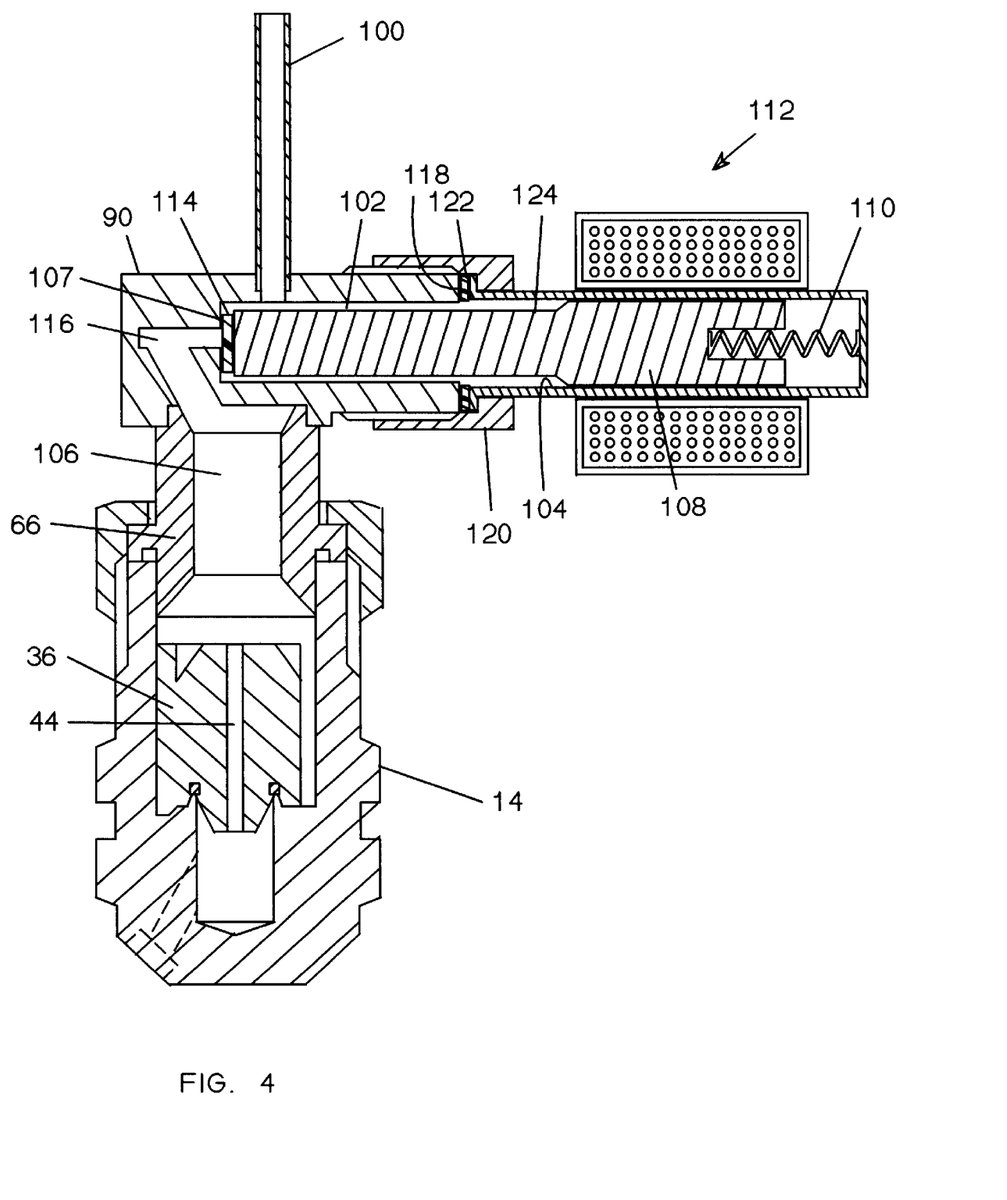
FIG. 4 is a sectional view of the device of FIG. 3.

FIG. 4 shows further details of the combined valve of FIG. 3. Portions of this device which are substantially the same as for the device of FIG. 2 are designated by the same reference numbers as used in FIG. 2. In this embodiment, instead of shutting off fluid flow by projecting a plunger to close the piston bore, a passageway is provided between an axially disposed entry port and the piston orifice, and a radially aligned solenoid plunger is adapted to close the pathway by coming into contact with a sealing surface within the junction block.

Junction block 90 has a first, radially extending passageway 102 communicating with entry pipe 100 and extending into solenoid housing 104 at one end, and at the other end communicating with an axially extending space 106 above the piston and defined by an upper extension of adapter flange 66. The junction block 90 has an annular flat surface 107 defined around the flow passageway and facing toward solenoid plunger 108 Bo as to provide for shutting off fluid flow when the plunger is moved to its extended position by action of spring 110 of solenoid 112. An elastomeric gasket 114 may be provided at the plunger tip to provide a more effective seal. Fluid is directed to axial space 106 through a path extending from flat surface 107 and progressing through connected paths at corner 116. As shown in the drawing, sealing between surface 107 and gasket 114 takes place at a location between entry pipe 100 and space 106 above the piston so as to close off flow to the piston.

Junction block 90 at its end 118 facing the solenoid has a surface 121 adapted for forming a seal with swivel nut 120, with a gasket 122 placed at the surface to enhance the seal when the nut is tightened on threads 124. The solenoid valve may have the same structure as described above with reference to FIG. 2.

Figure 5:
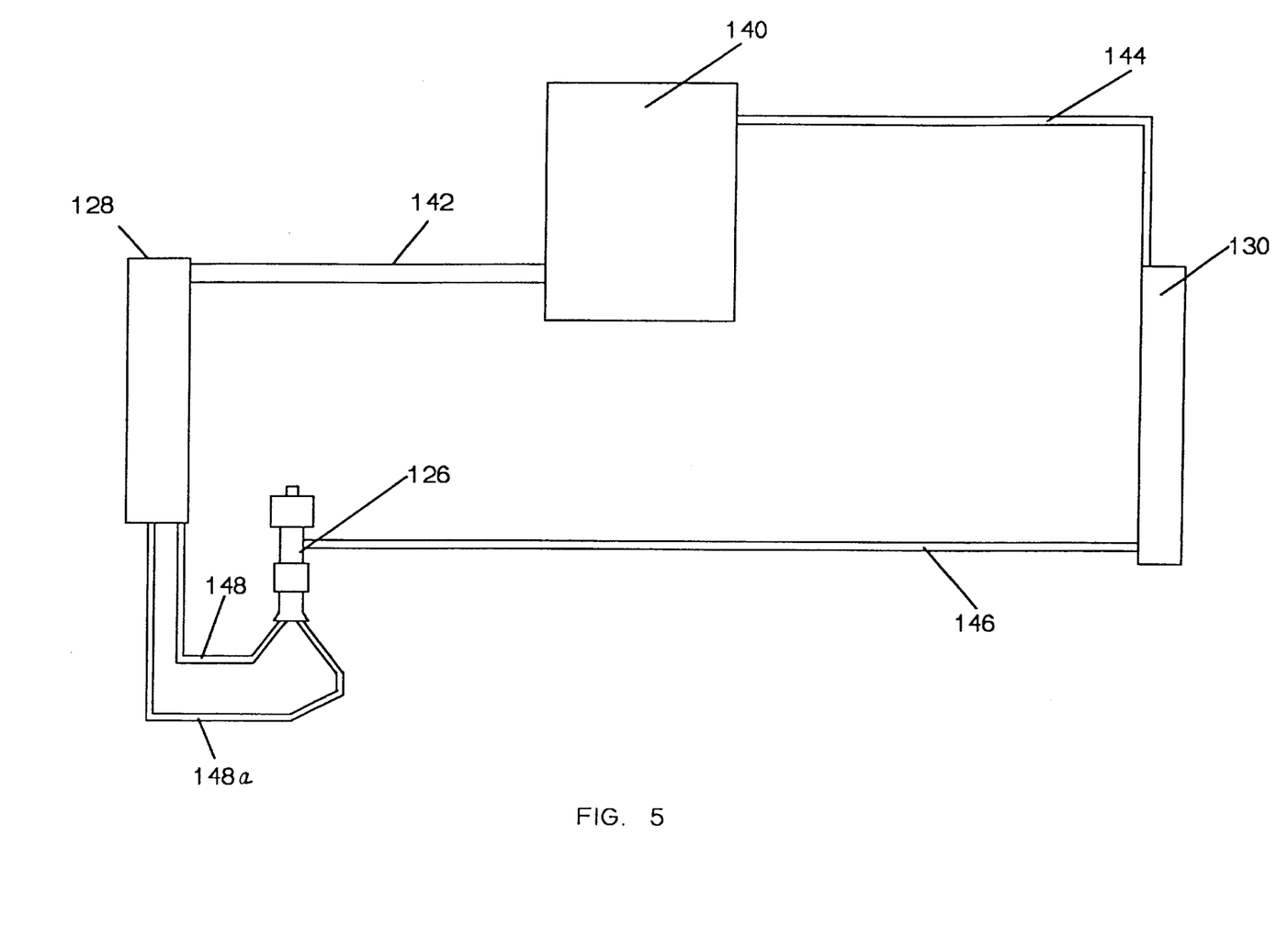
FIG. 5 is a schematic view of an air conditioning system in which a device of the present invention is incorporated.

FIG. 5 schematically shows an air conditioning system in which a combined piston orifice valve/solenoid actuated closure valve 126 of the present invention is located so as to function as an expansion device between an indoor heat exchanger 128 and an outdoor heat exchanger 130. In operation of this system low pressure refrigerant gas is conveyed by line 142 to compressor 140, producing high pressure gas, which is conveyed by line 144 to outdoor heat exchanger 130 where the gas is condensed, accompanied by a release of heat. The resulting liquid is forced under pressure through line 146 to combined valve 126, and the expanded refrigerant is then passed through lines 148, 148a to indoor heat exchanger 128, from which low pressure gas emerges, completing the cycle. When the system shuts off, a plunger in the solenoid valve is released to prevent flow of refrigerant across the piston of the expander in the combined valve. Pressure differential across the piston is thus maintained until the system is again turned on.

Figure 6:
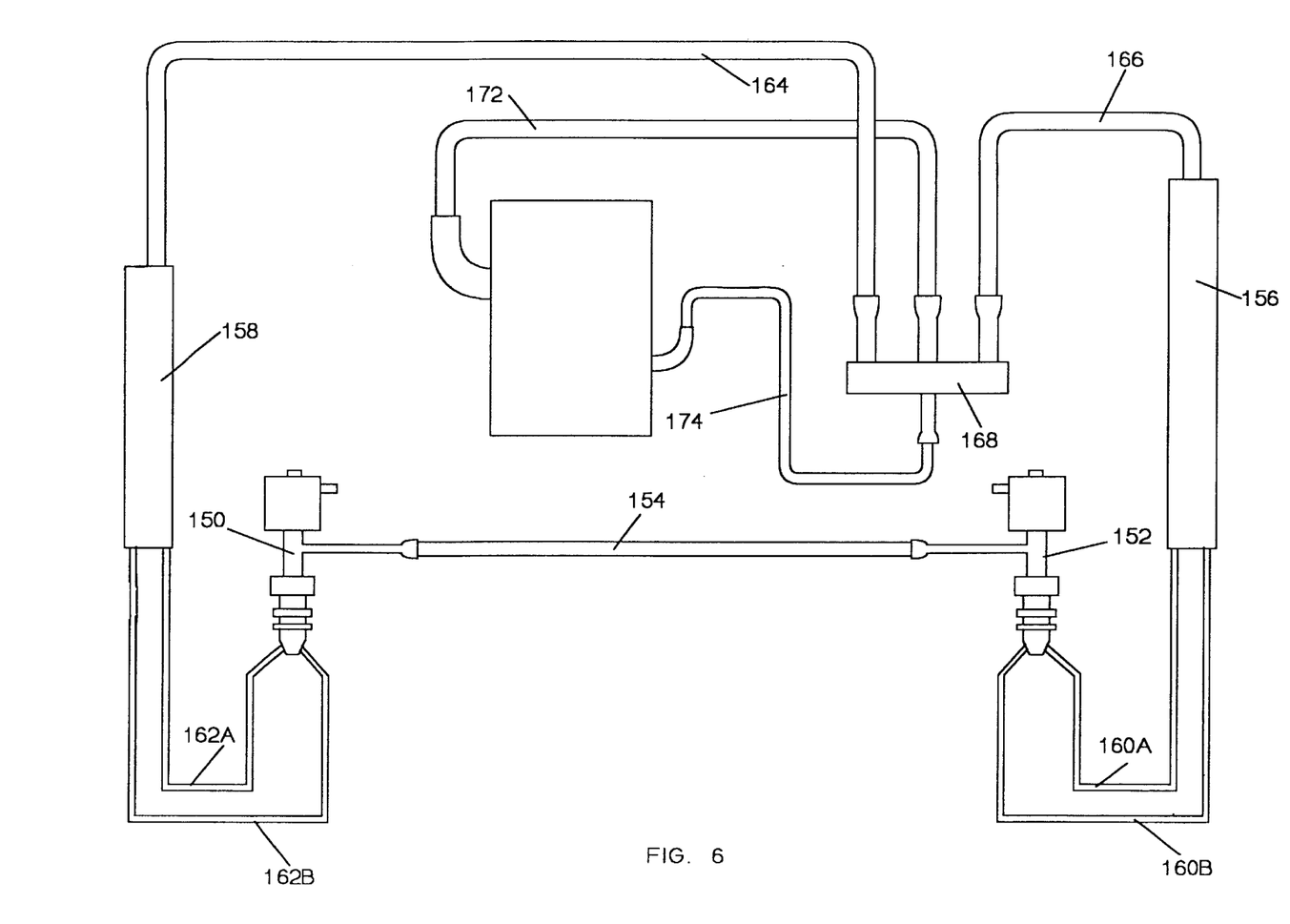
FIG. 6 is a schematic view of a heat pump system, including a pair of devices of the present invention.

FIG. 6 shows a system adapted for operation in a heat pump cycle, with a pair of valve assemblies of the present invention being used. The system includes two valve assemblies 150, 152 interconnected by line 154 an indoor heat exchanger 158 and an outdoor heat exchanger 156. The heat exchangers are connected by lines 164 and 156 to a cycle reversal valve 168. A compressor 170 is linked to the cycle reversal valve by lines 172 and 174.

The heat pump system operates generally the same as for the system at FIG. 5, but with the added complexity of using both the indoor and outdoor heat exchangers as both evaporators and condensers. That is, in normal air conditioning mode the outdoor heat exchange is a condenser and the indoor heat exchanger is a evaporator. When operated as a heat pump, the outdoor heat exchanger is a evaporator and the indoor heat exchanger is a condenser. In order to accomplish operation as a heat pump, two additional components are necessary: an additional expansion device is necessary for the outdoor heat exchanger, and a cycle reversing valve is necessary to change the direction of the refrigerant from the outdoor heat exchanger to the indoor heat exchanger and the return to the compressor from the indoor heat exchanger to the outdoor heat exchanger.

When the compressor is running, both solenoids are energized in both orifice/check valves to allow normal operation of the orifice/check valves; in air conditioning mode, the indoor orifice/check valve is forced into the forward or sealing position by refrigerant flow forcing all flow through the restricting orifice which causes the expansion of the refrigerant, and the outdoor orifice/check valve is moved in to the rearward or open position by refrigerant flow and allows the refrigerant to pass through the flutes on the outer diameter of the orifice/check valve without changing from a liquid to a gas. When operating in the heat pump mode, both orifice check valves change position by force of refrigerant flow,and the outdoor orifice/check valve is moved in to the sealing position and the indoor orifice/check valve is moved in to the open position.

When the compressor is turned off, both solenoids are de-energized and the plungers are moved by the bias spring to close off the flow passage of both orifice/check valves to prevent the equalization of pressure.

Valve assemblies of the present invention may find application as replacement parts for conventional devices in existing systems as well as for incorporation in newly designed systems. In both types of applications significant savings in energy costs may be realized.

It is to be understood that the embodiments descrivbed above are merely illustrative of the invention, which is not to be limited to such embodiments. The invention is limited only as defined in the appended claims.

What is claimed is:

1. A valve assembly comprising a piston-orifice expansion valve, a solenoid-actuated closure valve and a common housing enclosing both of said valves, said housing comprising:
   a first, forward housing wall portion having defined therein a generally cylindrical piston-receiving chamber including a forward end and a rearward end, said forward end having at least one exit port and a first sealing surface adapted to come into contact with a mating surface of a piston disposed in said chamber so as to restrict forward flow of fluid past said piston to flow through an axial bore therethrough, and said rearward end of said forward housing portion including a stop member limiting rearward movement of said piston;
   a second, intermediate housing wall portion connected to said rearward end of first portion and defining a fluid passageway communicating with said piston bore, said second portion further including a fluid entry port and an opening disposed to receive a solenoid-actuated plunger aligned for movement into engagement of an end of the plunger with a second sealing surface inside the housing; and
   a third housing portion connected to said second portion and supporting therein a said solenoid-actuated plunger adapted to come into contact with a said second sealing surface, whereby fluid flow across said housing may be shut off.

2. The assembly as defined in claim 1 wherein said second housing portion extends axially rearward with respect to said first portion, said fluid entry port therein communicates with a radially extending pipe and said third housing portion is disposed in axial alignment with said second portion and with said piston whereby a said plunger may be brought into contact with said piston bore.

3. The assembly as defined in claim 2 wherein said housing portion comprises an axial extension of said second portion and said assembly further comprises a generally tubular adapter having a circumferentially extending shoulder and a swivel nut engageable with said shoulder and threadably connected to said rearward end of said first portion.

4. The assembly as defined in claim 3 further comprising an elastomeric gasket connected to an outer end of said plunger.

5. The assembly as defined in claim 1 wherein said second housing portion comprises a junction block having defined therein a radially extending passageway adapted to receive said plunger and said third housing portion is aligned radially so as to provide for radial movement of said plunger.

6. The assembly as defined in claim 5 wherein said second sealing surface comprises an annular surface disposed around the periphery of said radially extending passageway and aligned to come into sealing contact with said plunger.

7. The assembly as defined in claim 6 wherein said fluid entry port is defined in a rearward end of said junction block.

8. The assembly as defined in claim 5 further comprising a swivel nut connecting said third housing to an end of said junction block.

* * * * *